United States Patent Office 2,852,502
Patented Sept. 16, 1958

2,852,502

HALF METAL COMPLEXES OF ACYLACETONI-
TRILE AZO DYES CONTAINING THE SULFON-
AMIDE GROUP

Robert Sidney Long, Bound Brook, Sien Moo Tsang,
Middlesex, and Joseph Rogers Leal, Plainfield, N. J.,
assignors to American Cyanamid Company, New York,
N. Y., a corporation of Maine No Drawing. Application September 11, 1956
Serial No. 609,067

12 Claims. (Cl. 260—149)

This invention relates to metallized azo dyes in which two molecules of a monoazo dye containing an acylacetonitrile and a sulfonamide group, are chelated with one atom of metal, and more specifically to the half metal complexes of dyes of the formula:

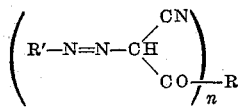

wherein R is an aromatic radical, $n$ is a positive integer less than 3, and R' is a sulfamylaryl radical of the benzene series containing a metallizable group ortho to the azo bridge. These dyes show excellent affinity for superpolyamide fibers from neutral or weakly acid dyebaths and also dye wool, leather, and other animal and polyamide fibers well.

Metallized azo dyes derived from aroylacetonitriles are already well known. Such dyes contain sulfonic groups and are of value in the dyeing of animal fibers, especially wool. However, they must be dyed on wool from a strongly acid bath, which may tender or damage the wool fiber. Some efforts were made to apply these dyes from neutral dyebaths but costly dyeing assistants were needed to obtain level dyeings.

The metallized dyes in the prior art which were derived from acylacetonitriles, and contained sulfonic acid groups, have not shown appreciable affinity for superpolyamide fibers. Cloth woven from mixtures of these fibers and wool, when treated with these dyes, present an unattractive uneven or mottled appearance, since the superpolyamide fibers are at best only slightly stained, whereas the wool fibers are well dyed. Furthermore, the dyeing of superpolyamide fibers alone in strong, fast colors is important because such fibers are being used in such large quantity in the present textile market.

We have found that metallized azo dyes prepared by coupling a sulfamyl aryl diazonium salt having a metallizable group ortho to the diazo with an aroylacetonitrile, followed by "half metallization," are excellent dyes for both wool and nylon. By "half metallization" is meant the preparation of the metal complex in which one atom of the metal is chelated with two molecules of the azo dye.

The metallized dyes of our invention are particularly advantageous in the dyeing of wool-superpolyamide blends. They show a surprising affinity for superpolyamide fibers such as hexamethylenediamine polyadipamide, and the polyamide from ε-aminocaproic acid and union dyeings of such blends have full uniform and attractive shades and textures. Such dyes fill a big need in the textile industry.

It is an additional advantage of the dyes of our invention that they show good solubility in water and are readily dissolved, not only in the usual neutral and slightly acid dyebaths, but also in the more concentrated stock solutions usually used. It is a still further advantage of our invention that these dyes can be used in such neutral or slightly acid baths, which removes the danger of damaging the fibers.

It is a further advantage of our dyes that they have unexpectedly attractive shades. Thus, the brown dye of Example 2 is a bright lively reddish hue of brown, while the brown dyes of commerce, not containing acylacetonitrile residues, have a duller, drabber appearance. Another advantage of our dyes is that they have superior washfastness, and have greater acid stability as shown by fastness to carbonizing, a standard test, as against previous dyes for superpolyamides.

We obtain the dyes of our invention by coupling an aromatic amine containing a sulfamyl group, and a hydroxy or carboxy group ortho to the amino group with an aroylacetonitrile. The coupling product is a metallizable azo dye. We then metallize the azo dye so as to obtain one atom of heavy metal to each two azo groups. Heavy metals of atomic numbers 24 to 28 are employed for this purpose. The metallized products are the dyes of our invention.

The aromatic amines which we use to obtain the starting materials of our invention are usually amines of the benzene series. Suitable amines for the practice of our invention are:

2-amino-1-phenol-4-sulfonamide
2-amino-1-phenol-5-sulfonamide
2-amino-4-methyl-1-phenol-5-sulfonamide
2-amino-4-chloro-1-phenol-6-sulfonamide
2-amino-6-chloro-1-phenol-4-sulfonamide
2-amino-4-methoxy-1-phenol-6-sulfonamide
2-amino-1-phenol-4,6-disulfonamide
2-amino-N-methyl-1-phenol-4-sulfonamide
2-amino-N-ethyl-1-phenol-4-sulfonamide
2-amino-N-(2-hydroxyethyl)-1-phenol-4-sulfonamide
2-amino-1-phenol-4-sulfonanilide
2-amino-6-nitro-1-phenol-4-sulfonamide
2-amino-4-nitro-1-phenol-6-sulfonamide
5-sulfamyl anthranilic acid These aromatic amines, when coupled to aroylacetonitriles, give azo dyes which are the starting materials for the metallized dyes of our invention. The aroylacetonitriles have the formula $R(COCH_2CN)_n$, in which R is an aromatic radical such as benzene or naphthalene or their alkyl, chloro, alkoxy, aralkyl, or hydro derivatives, and, $n$ may be 1 or 2, depending on whether the aroylacetonitrile is derived from a monobasic or dibasic acid in the Claisen condensation with acetonitrile.

Diazotization and coupling may be performed by methods well known in the art. For example, coupling may be performed in alkaline medium by the addition of caustic, soda ash, or sodium acetate, depending upon the particular diazo component employed. The temperature of coupling may range from ice-cold to somewhat above room temperature.

The azo dyes obtained by the coupling are then converted to their half metal complexes. This is done by heating one mol of the dyestuff with 0.5 to 1.0 mol of a heavy metal salt. Only a half mol of metal actually goes into the complex formation per mol of dyestuff, but an excess is sometimes desirable. The metals which may be used are those of atomic numbers 24 to 28. The metal salt is preferably either the chloride, the sulfate or the salt of an aliphatic acid. Some oxides can also be used. The metallization may be carried out in aqueous medium or non-aqueous solvents such as pyridine, formamide or dimethyl formamide may be used. Of particular interest are the cobaltous and chromic salts such as cobalt acetate, chloride, or oxide, and chromic acetate, propionate, formate, fluoride, chloride, sulfate, or oxide. When metallization is carried out in non-aqueous media, temperatures in the range of 90–150° C. are maintained.

Aqueous metallizations are carried out preferably at or near the boil, in a medium ranging from weakly acid to weakly alkaline. On the alkaline side it may be necessary to add agents which keep the metal in solution, as for example, ammonia and amines, glycine, and acids such as tartaric, citric, glycolic or salicylic.

While all of the possible combinations above yield dyes which dye superpolyamide, and wool-superpolyamide unions, form neutral or weakly acid bath, to give level shades outstanding in fastness to washing and dry cleaning, certain specific combinations seem to show slightly greater affinity for superpolyamide fibers and excellent to very good light fastness. These preferred species combine exceptional affinity for superpolyamide with outstanding fastness to light. One such is the half cobalt or half chromium complex of the monoazo dye made by coupling 1-amino-2-hydroxy-5-benzenesulfonamide (otherwise named o-aminophenol-4-sulfonamide) to benzoylacetonitrile. This may be represented by the formula:

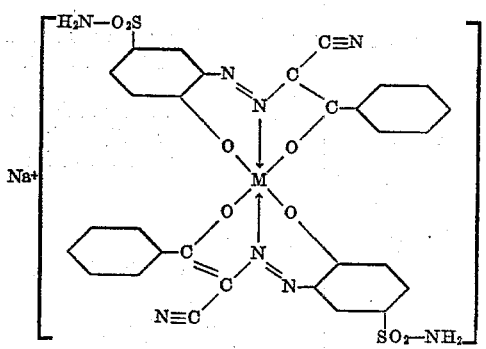

where M is cobalt or chromium. The cobalt derivative dyes superpolyamide and animal fibers orange while the chromium derivative dyes superpolyamide and animal fibers intense brown shades. These preferred compounds show excellent fastness to washing, acid and alkaline perspiration, light and carbonizing. In general, the preferred type is the one-half cobalt or chromium complex of the azo dye obtained by coupling a sulfamyl o-aminophenol to a benzoylacetonitrile.

The lighter shades of our dyes are suitable for a complete range of superpolyamide hosiery shades. In light and dark shades, our dyes can be used in lacquers, varnishes, as spirit colors, and wherever transparent colors are needed.

This application is a continuation-in-part of our co-pending application, Serial No. 509,092, filed May 17, 1955, now abandoned.

The following examples are intended to illustrate our invention without limiting it. Parts are by weight unless otherwise noted.

*Example 1*

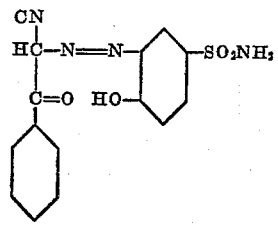

To a cold mixture of 200 parts water with 95 parts of 2-amino-1-phenol-4-sulfonamide and 145 parts of 20° Bé. hydrochloric acid is added 86.3 parts of 40% sodium nitrite solution. When diazotization is complete the mixture is added to a solution of benzoylacetonitrile prepared by adding 75.5 parts of benzoylacetonitrile to 500 parts water containing 60 parts of sodium hydroxide. When coupling is complete, the mixture is heated to about 60° C., acidified with 50% acetic acid solution, and the azo product filtered and dried.

*Example 2*

A mixture of 75.6 parts of the azo dye prepared in Example 1 with 450 parts of water, 155.3 parts by volume of a chromium acetate solution containing 5.2 parts of chromium and 28.7 parts of anhydrous sodium acetate is boiled until chromation of the azo dye is complete. The chromated product is isolated by filtration and dried.

In neutral or acid dyebath, this azo dye dyes superpolyamide fibers and wool and unions thereof lively reddish-brown shades of good fastness to light and washing. Cotton, viscose, acetate, polyacrylic and polyterephthalic ester fibers are left white under these dyeing conditions.

This dye has good solubility in water. The solubility may be increased by blending the dry dye with small amounts of alkali and a dispersing agent.

*Example 3*

A mixture of 7.56 parts of the azo dye prepared in Example 1 with 68 parts of formamide and 2.47 parts of chromic acetate is heated around 120° C. until chromation is complete. To isolate the chromated azo product, 100 parts of water are added, followed by addition of 25 parts of salt. The product is isolated by filtration, washed with 10% salt solution and dried.

When died in neutral or weakly acid dyebath, it dyes wool and superpolyamide fibers essentially like the product of Example 2.

*Example 4*

If in Example 3, the 2.47 parts of chromic acetate is replaced with 2.49 parts of cobalt acetate $$Co(C_2H_3O_2)_2.4H_2O$$

and the other ingredients and procedures remain the same, the half cobalt complex of the azo dye of Example 1 is obtained.

In a neutral dyebath, medium orange shades are produced on superpolyamide fibers and wool which have an excellent fastness to light and washing. The dye has good solubility in water.

*Example 5*

To a hot mixture of 68.8 parts of real dyestuff prepared according to Example 1 and 400 parts of water is added 24.3 parts of cobalt chloride and 24.6 parts of anhydrous sodium acetate. The mixture is heated at reflux until formation of the cobalt complex of the dye is complete. The reaction mixture is then cooled and the product is separated by filtration and dried.

When dyed from a neutral dyebath to which a small amount of ammonium acetate is added, the product gives orange shades on superpolyamide fibers and wool, essentially like the shades of Example 4. The dye has no affinity for cotton, viscose, polyacrylic and polyterephthalic ester fibers under these conditions.

*Example 6*

A mixture of 3.44 parts of real dye prepared in Example 1, 1.35 parts of ferric chloride, $FeCl_3.6H_2O$, 0.68 part of sodium acetate, $NaOAc.3H_2O$, and 57 parts of formamide are heated at 120–130° C. until ferration is complete. The mixture is then combined with 300 parts of saturated sodium chloride solution and the precipitated dye is isolated by filtration, washed with water and dried.

When dyed on wool and superpolyamide fibers from neutral or weakly acid bath the product gives brown shades.

*Example 7*

A mixture of 3.44 parts of the azo dye prepared according to Example 1, 1.18 parts of nickelous chloride $NiCl_2.6H_2O$, 0.68 part of sodium acetate trihydrate and 57 parts of formamide are heated at 120–130° C. until formation of the nickel complex of the azo dye is complete. The reaction mixture is then combined with 300 parts of saturated sodium chloride solution and the precipitated product is filtered, washed with water and dried.

When dyed in weakly acid bath the product gives yellow to orange shades on superpolyamide fibers and wool.

*Example 8*

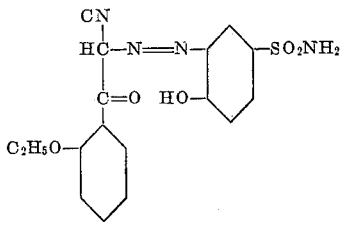

To a cold mixture of 9.41 parts of 2-amino-1-phenol-4-sulfonamide, 125 parts of water and 54 parts of 16.8% hydrochloric acid, is added, 50 parts by volume of sodium nitrite solution containing 3.45 parts sodium nitrite. The mixture containing the diazo is added to a cold solution prepared by mixing 11.35 parts of o-ethoxy-benzoylacetonitrile with 104.5 parts water, 14.2 parts 16.8% sodium hydroxide solution and adding 104 parts of 20% sodium carbonate solution and cooling.

When coupling is complete the mixture is neutralized with acetic acid solution and salted with 30 parts sodium chloride. The azo product is isolated by filtration and dried. It may be recrystallized from 2:1 formamide-water solution.

*Example 9*

A mixture of 7.76 parts of the azo dye prepared in Example 8, 2.49 parts of cobalt acetate $Co(C_2H_3O_2)_2 \cdot 4H_2O$ and 80 parts of formamide are heated at about 120° C. until formation of the cobalt complex of the azo dye is complete. The mixture is then diluted with 200 parts of water and salted with 40 parts of salt. The metallized product is isolated by filtration, washed with 10% salt solution and dried.

It has good solubility in water, and when dyed from neutral or weakly acid baths, it dyes superpolyamide fibers and wool orange shades of excellent wet and light fastness.

*Example 10*

A mixture of 7.76 parts of the azo dye prepared in Example 8, 2.47 parts chromic acetate and 80 parts of formamide are heated to about 120° C. until chromation is complete. The mixture is diluted with 100 parts of water and salted with 25 parts salt. The metallized azo product is isolated by filtration, washed with 10% salt solution and dried. It has good solubility in water.

When dyed from neutral or weakly acid bath, intense brick red shades were produced on superpolyamide fibers. Brick red shades were also obtained using wool, or mixtures of wool and superpolyamide fibers with very good light and wash fastness.

*Example 11*

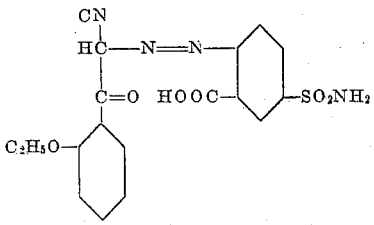

To a cold mixture of 10.8 parts of 2-amino-5-sulfamylbenzoic acid, 125 parts water and 43 parts of 16.8% hydrochloric acid, is added 50 parts by volume of sodium nitrite solution containing 3.45 parts of sodium nitrite. The mixture containing the diazo is added to a cold solution prepared by mixing 11.35 parts of o-ethoxy-benzoylacetonitrile with 104.5 parts water, 14.2 parts 16.8% sodium hydroxide solution and adding 104 parts of 20% sodium carbonate solution and cooling.

When coupling is complete, the mixture is neutralized with acetic acid solution and salted with 30 parts sodium chloride. The azo product is isolated by filtration and dried.

*Example 12*

When 8.9 parts of the dyestuff prepared in Example 11 are treated with cobalt using the procedure of Example 9, the cobalt containing dyestuff which is obtained, when dyed according to the procedure of Example 16 dyes superpolyamide and wool fibers yellow to tan shades.

*Example 13*

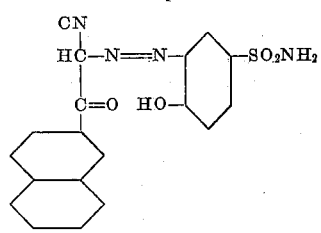

A mixture of 19.0 parts 2-amino-1-phenol-4-sulfonamide, 17.4 parts of 20° Bé. hydrochloric acid and 300 parts of water and cooled to about 5° C. is diazotized by the addition of 17.1 parts of 40% sodium nitrite solution.

The diazo solution is added to a solution of 29.5 parts of 2-naphthoylacetonitrile in 700 parts of water with 14 parts of 50% sodium hydroxide solution. When coupling is complete the mixture is acidified with acetic acid and the dyestuff filtered and washed with 500 parts water.

*Example 14*

A mixture of 11.8 parts of the dye prepared in Example, 13, 3.16 parts of chromic acetate and 68 parts of formamide are heated at 120–130° C. until chromation is complete. The hot reaction mixture is then clarified with talc and Super-Cel (diatomaceous earth) and the hot filtrate poured into 480 parts of 30% sodium chloride solution. The slurry is cooled and the chromated dye isolated by filtration, washed with water and dried.

When dyed from neutral or weakly acid bath, the product dyes wool and superpolyamide fibers burnt sienna shades of excellent fastness.

*Example 15*

A mixture of 11.9 parts of the dye prepared in Example 13, 3.74 parts of cobaltous acetate tetrahydrate and 68 parts of formamide are heated at 120–130° C. until metallization of the dye is complete. The hot reaction mixture is clarified with talc and diatomaceous earth and poured into 344 parts of 20% sodium chloride solution. The cobalt complex of the dye precipitates. It is isolated by filtration, washed with 10% sodium chloride solution and dried. From a neutral dyebath, it dyes wool and superpolyamide fibers a reddish orange shade of excellent fastness.

*Example 16*

Five parts of superpolyamide or wool fabric or yarn is used for the dyetest. The quantities for the dyebath are calculated on the weight of the fabric or yarn. The amount of dyestuff used is 0.5%, 1%, or 3%, of the 5 parts, or 0.025 part, 0.05 part, or 0.15 part, depending on the depth of shade desired. Ammonium acetate also may be used, the quantity being 3% by weight of the fabric or 0.15 part. These ingredients are dissolved in 300 parts of water. The fabric is then added and the dyebath raised slowly to the boil and boiled one hour. The fabric is then removed, washed with water and dried. The results obtained by using this procedure for the dyes of this invention are recorded in the preceding examples.

Example 17

A sample of chrome tanned grain calf leather is subjected to the following procedure where all quantities are based on the parts by weight of the leather.

(1) Wash ten minutes at 120° F.
(2) Float in five times its weight of water at 120° F.
(3) Add 1% sodium bicarbonate—run 30 minutes.
(4) Wash ten minutes at 120° F.
(5) Refloat in fivefold of water at 120° F.
(6) Add 1% dye—run 30 minutes.
(7) Add ½% formic acid—run 15 minutes.
(8) Rinse, set out, tack, air dry.

The dyestuff of Example 2 produces a very level shade of red brown when dyed according to this procedure. It exhausts well, exhibits consistent surface build-up, dyes the flesh side heavier than the grain and develops in strength upon glazing. It is an excellent dye to choose for the production of mahogany shades on chrome grain leathers.

Example 18

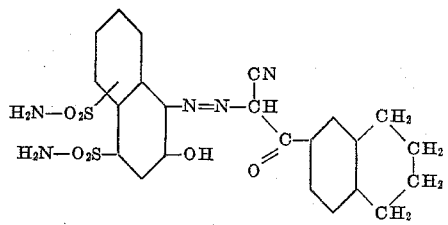

The disulfonamide obtained by phosgenating 1-amino-2-naphthol-4-sulfonic acid, treating with chlorsulfonic acid (as per U. S. Patent 1,939,025), ammonolyzing the disulfonyl chloride, and saponifying the oxazolone ring by warming with caustic, is diazotized in the known manner in the presence of copper sulfate and coupled to 6-cyanaceto-1,2,3,4-tetrahydronaphthalene. Chromation of the product by the procedure of Example 2 gives a metallized dye which gives fast brown shades on wool and superpolyamide fibers.

Example 19

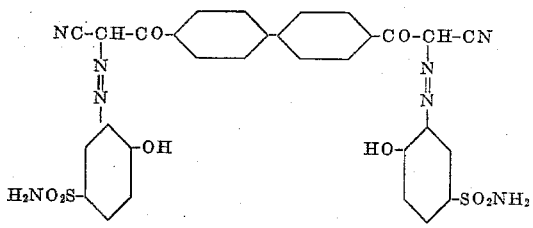

The procedure of Example 1 is followed using an equivalent quantity of 4,4'-dicyanoacetylbiphenyl (allowing for the two acylacetonitrile groups in the molecule) in place of the benzoylacetonitrile. The product is chromed by the procedure of Example 2, using twice as much chromium. The resulting dye colors superpolyamide fibers a red brown shade.

Example 20

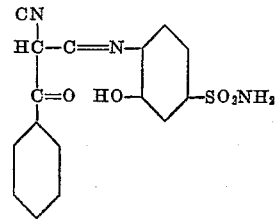

In 550 parts of water is slurried 94.1 parts of 2-aminophenol-5-sulfonamide. One hundred seventy-one parts by volume of conc. 38% hydrochloric acid is added, and after cooling to 5° C., 66.5 parts by volume of 40% sodium nitrite solution is added. The yellow diazo compound precipitates and is stirred at 5° C., until diazotization is complete.

To 600 parts of water is added 79.7 parts of benzoylacetonitrile and 50 parts by volume of 5 N sodium hydroxide solution, and the mass cooled to 5° C. The solution of diazo prepared above is added gradually at 5° C. while maintaining the alkalinity to a pH of about 10–11. The mixture is stirred at 5° C. for several hours and then, without temperature control, until the coupling is complete. On cooling, the desired azo product precipitates. It is redissolved in 750 parts of dilute caustic soda and then acidified with conc. hydrochloric acid to precipitate the dyestuff, which is isolated by filtration and dried.

Example 21

51.65 parts of the azo dyestuff prepared in Example 20 is dissolved in 335 parts by volume of formamide at 105° C. 15.8 parts of chromic acetate, containing 24.7% chromium, is added and the mass heated at 120° C. for 5 hours. The reaction mixture is then cooled to room temperature and drowned in 700 parts of water. After clarification of the aqueous solution of the half-chromium complex of the dyestuff, the dye is isolated by salting with 259 parts of sodium chloride at 75° C. The precipitated product is isolated and redissolved in 900 parts of water and salted with 225 parts of salt at 75° C. The mixture is stirred and cooled to room temperature. The precipitated product is isolated by filtration, dried and taken up in 600 parts by volume of boiling alcohol. The solution is clarified and evaporated to dryness to give the metallized dyestuff having two molecules of dyestuff to one atom of metal.

When the half-chromium complex prepared above is dyed in neutral or acid dye bath, a red-brown shade of excellent fastness to light is obtained on wool and nylon.

Example 22

To 35 parts by volume of formamide is added 5 parts of the dye of Example 20 and 1.59 parts of cobalt acetate. The reaction mixture is heated at 120° C. until formation of the half-cobalt complex is complete. Water is added to a volume of 125 parts of 75° C. and 19 parts of sodium chloride is added. The mixture is then cooled and the dyestuff isolated by filtration. The product is then redissolved in 140 parts of water and resalted with 35 parts of sodium chloride. The product when solidified is isolated by filtration and finely ground. It is then extracted with 2 portions of 125 parts by volume of alcohol. The alcohol solution of the half-cobalt complex of the dyestuff is evaporated to dryness to isolate the product.

When this product is dyed from a neutral or slightly acid dyebath, a red-orange shade of excellent fastness is obtained on wool and nylon.

Example 23

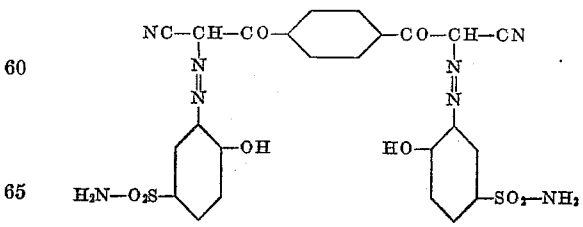

The procedure of Example 18 is followed using 1,4-biscyanoacetyl benzene (prepared by the Claisen condensation of terephthalic ester on acetonitrile) in place of the di-cyanoacetyldiphenyl. The product, after chroming, dyes superpolyamide fibers a red brown shade.

Similarly, 1,5-bis-cyanoacetyl naphthalene (prepared by the Claisen condensation of naphthalene 1,5-dicarboxylic ester with acetonitrile) can be similarly used.

We claim:
1. Heavy metal-dye complexes having one atom of metal selected from the group consisting of atomic number greater than 23 but less than 29, chelated with two molecules of a dyestuff of the formula:

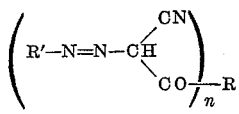

wherein R is a carbocyclic aromatic radical of less than three 6-membered rings, $n$ is a positive integer less than 3, and R' is a carbocyclic sulfamylaryl radical of one 6-membered ring containing, ortho to the azo group, a metallizable group selected from the group consisting of hydroxy and carboxy.

2. Heavy metal-dye complexes having one atom of a metal selected from the group consisting of chromium and cobalt chelated with two molecules of a dyestuff of the formula:

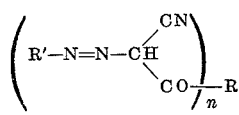

in which R is a carbocyclic aromatic radical of less than three 6-membered rings, $n$ is a positive integer less than 3, and R' is a carbocyclic sulfamylaryl radical of one 6-membered ring containing, ortho to the azo group, a metallizable group consisting of hydroxy and carboxy.

3. The dyes of claim 1 in which $n$ is 1.
4. The dyes of claim 2 in which $n$ is 1.
5. Heavy metal-dye complexes having one atom of a metal selected from the group consisting of chromium and cobalt chelated with two molecules of a dyestuff of the formula:

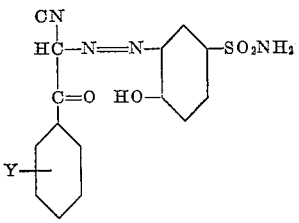

wherein Y is selected from the group consisting of hydrogen, methoxy and ethoxy.

6. A chromium complex of an azo dyestuff of the formula:

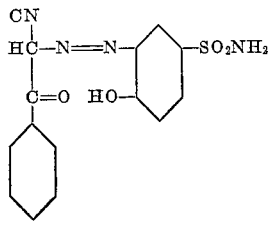

having one atom of chromium chelated with two molecules of said dyestuff.

7. A cobalt complex of an azo dyestuff of the formula:

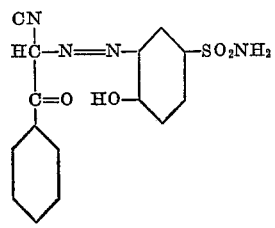

having one atom of cobalt chelated with two molecules of said dyestuff.

8. A chromium complex of an azo dyestuff of the formula:

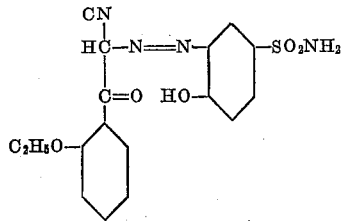

having one atom of chromium chelated with two molecules of said dyestuff.

9. A cobalt complex of an azo dyestuff of the formula:

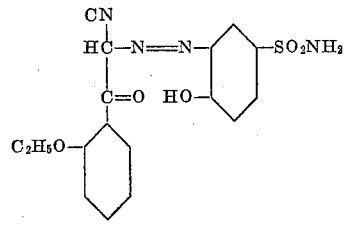

having one atom of cobalt chelated with two molecules of said dyestuff.

10. Heavy metal complexes having one atom of a metal selected from the group consisting of chromium and cobalt chelated with two molecules of a dyestuff of the formula:

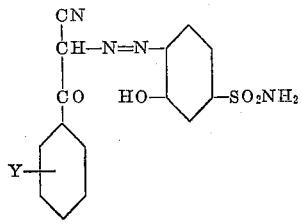

wherein Y is selected from the group consisting of hydrogen, methoxy and ethoxy.

11. A chromium complex of an azo dye of the formula:

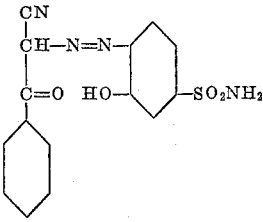

having one atom of chromium chelated with two molecules of said dyestuff.

12. A cobalt complex of an azo dyestuff of the formula:

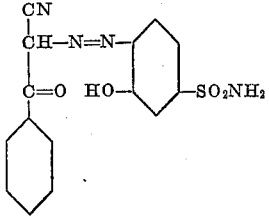

having one atom of cobalt chelated with two molecules of said dyestuff.

References Cited in the file of this patent
UNITED STATES PATENTS 2,366,633    Long    Jan. 2, 1945
2,674,515    Widmer et al.    Apr. 6, 1954

OTHER REFERENCES

Venkataraman: Synthetic Dyes, 1952, page 540.